UNITED STATES PATENT OFFICE.

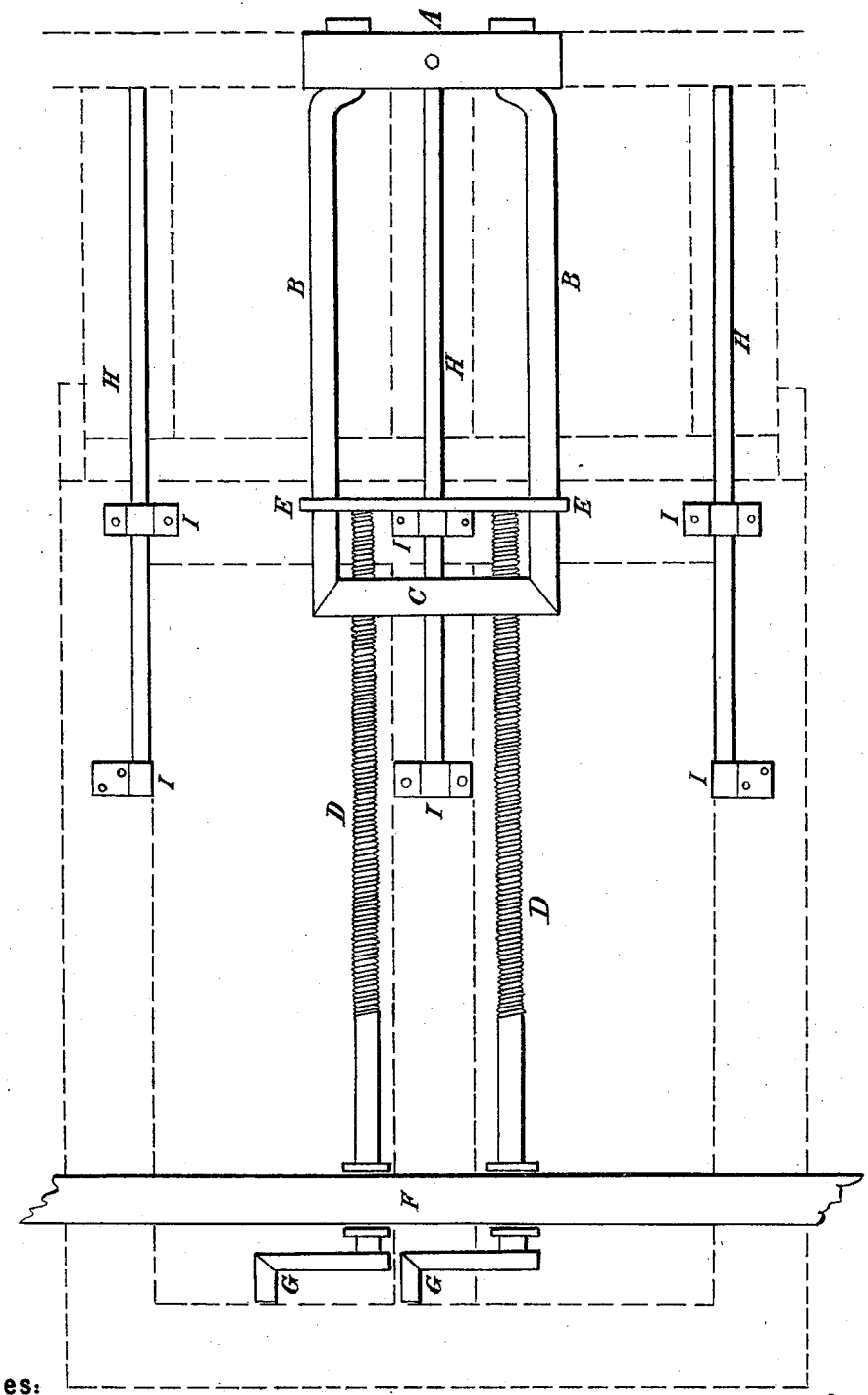

BENJAMIN W. GAY, OF NEW LONDON, NEW HAMPSHIRE.

EXTENSION-VEHICLE.

Specification of Letters Patent No. 13,428, dated August 14, 1855.

*To all whom it may concern:*

Be it known that I, BENJAMIN W. GAY, of New London, in the county of Merrimack, in the State of New Hampshire, have invented a new and useful Improvement on Vehicles; and I do hereby declare that the following is a full and exact description thereof, reference being had to the accompanying drawing and to the letters of reference marked thereon.

The nature of my invention consists in so constructing vehicles—whether on runners or wheels—as to be capable of being extended to a double seated, or contracted into a single seated conveyance, by means of a double or single screw-perch connecting the fore and hind bed-pieces together. And to enable others skilled in the mechanic arts to make and use my invention, I will proceed to describe its construction and operation.

The annexed drawing represents the body of a carriage at its fullest extension.

At letter A, is represented the front rocker or bed-piece into which are fastened the reaches B. The cross head of these reaches, marked C, is threaded to receive the screws D, and the strap E, which gives steadiness and strength to the whole, is also tapped for the reception of the screws D. These screws have fixed bearings in the back bed-piece marked F, and are turned by crank G.

To guide, strengthen, and support the front floor of the vehicle, I apply rods H, attaching them to the forward cross-pieces, and allowing them to slide through clamps I on the under side of hind part. The front part of the body slides within and upon the back part.

The seats have nothing peculiar in their construction only that the back seat is made large enough to receive or incase the front one, so that when the screws D, are tightened up; in other words, when the vehicle is contracted or drawn together, it presents the appearance of a single-seated conveyance, and can be used as such. I also apply on my extenesion vehicles an extending and contracting top, the front part of which shuts into the back part in like manner as the seats; and which is capable of being removed from the one or the other of the seats at pleasure.

What I claim then as my invention, and desire to secure by Letters Patent is—

1. The screw-perch constructed and operated in the manner and for the purposes herein set forth.

2. The application, in combination with said perch, of the rods H as within described.

BENJAMIN W. GAY.

Witnesses:
 TIMO. HOSKINS,
 W. C. STINOE.